INVENTOR.
JACK G. FISHER

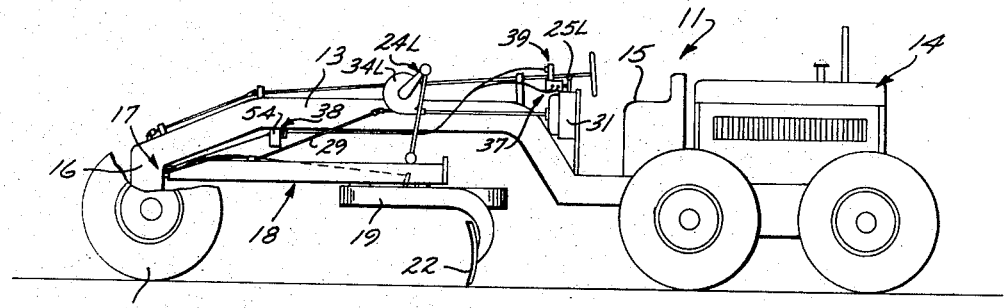
FIG. 1
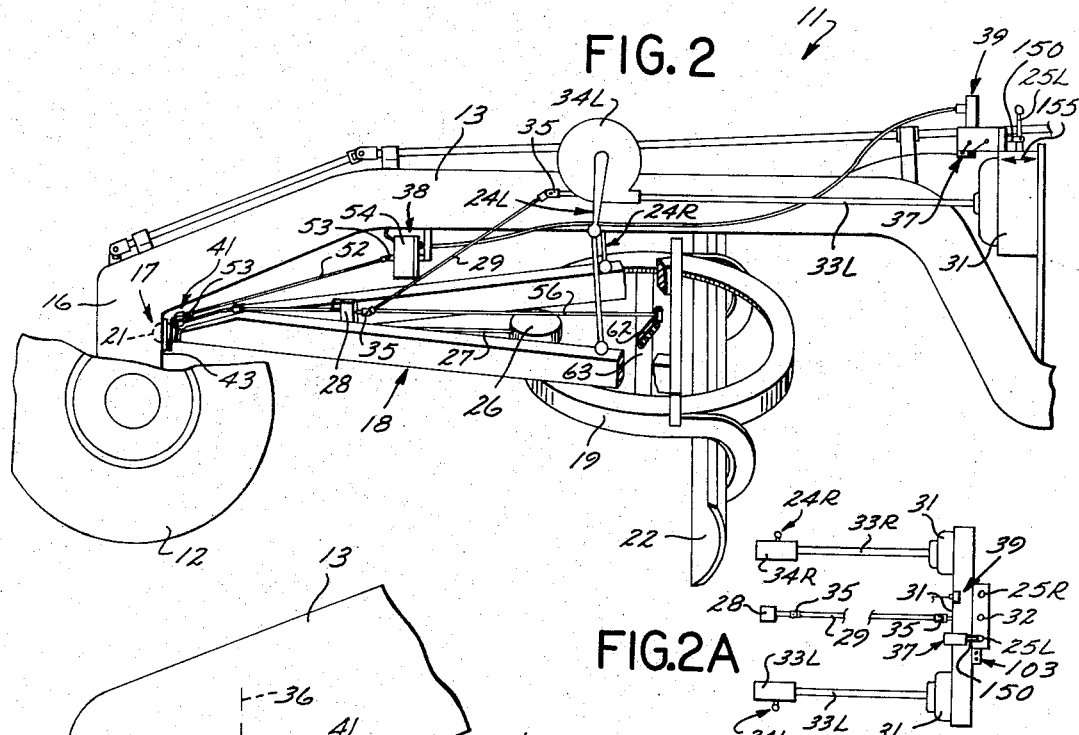
FIG. 2
FIG. 2A
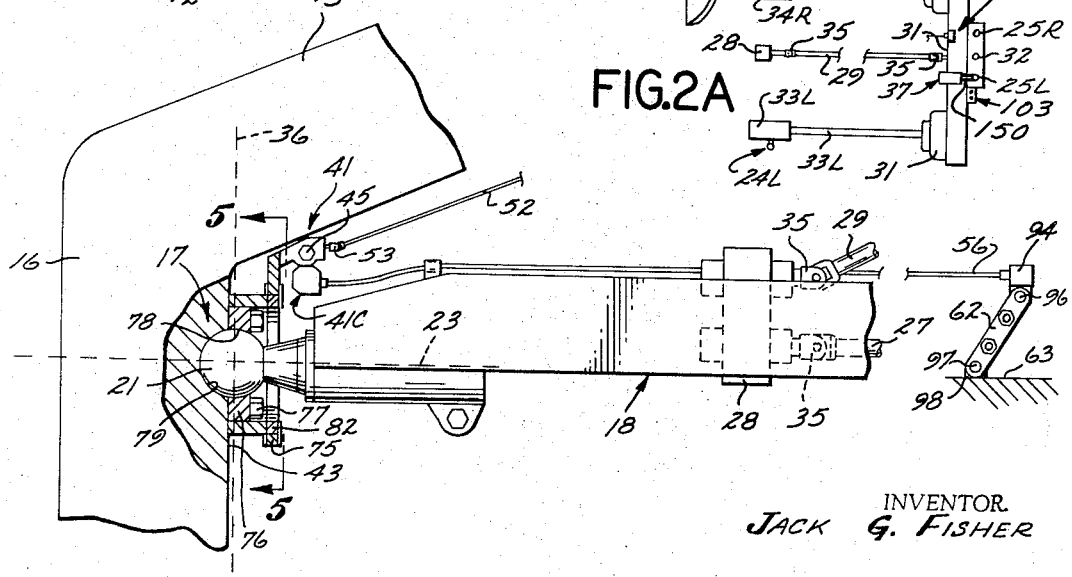
FIG. 3
INVENTOR.
JACK G. FISHER Sept. 26, 1967 J. G. FISHER 3,343,288
BLADE LEVEL CONTROL APPARATUS FOR A GRADING MACHINE
Filed March 1, 1965 5 Sheets-Sheet 2

Sept. 26, 1967  J. G. FISHER  3,343,288
BLADE LEVEL CONTROL APPARATUS FOR A GRADING MACHINE
Filed March 1, 1965  5 Sheets-Sheet 3
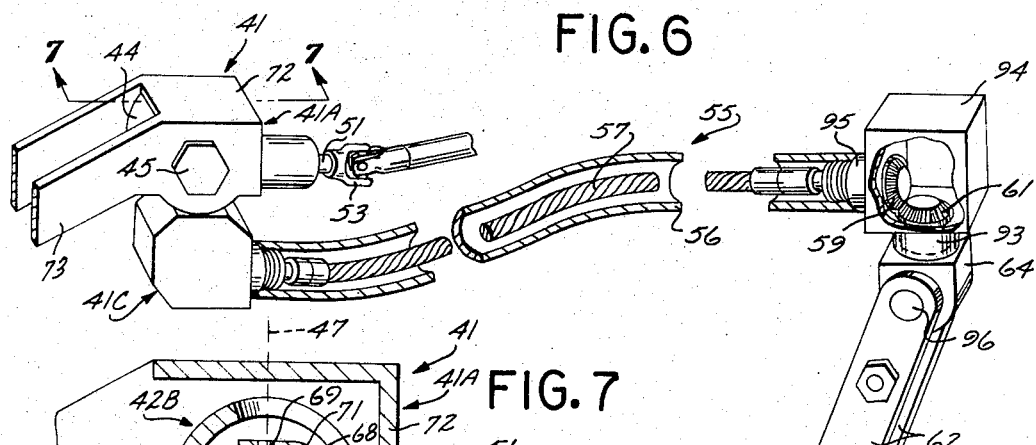
FIG. 6
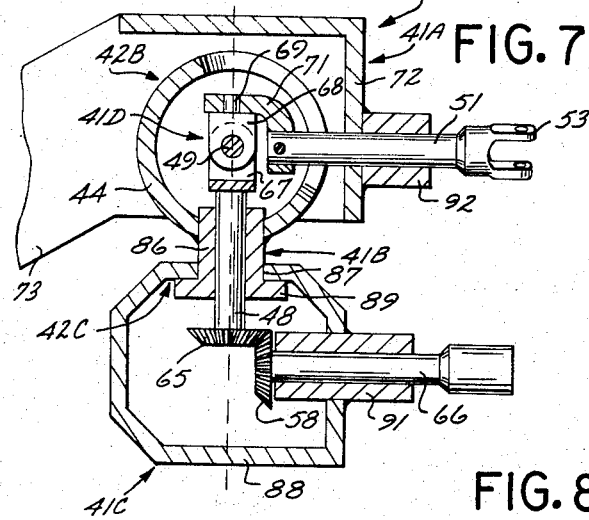
FIG. 7
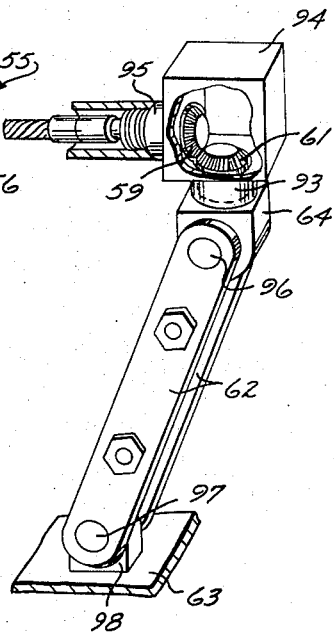
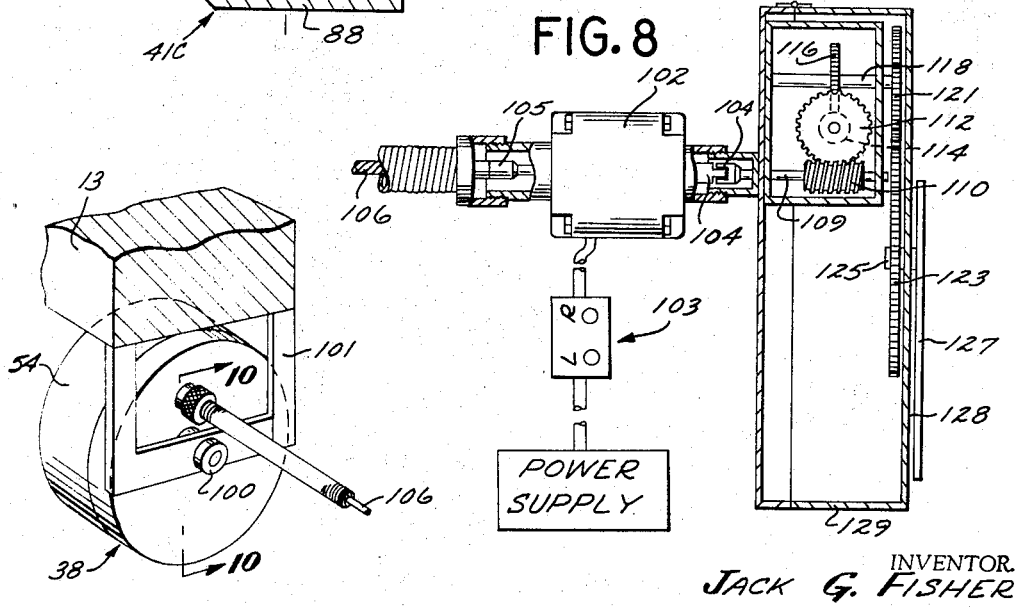
FIG. 8
FIG. 9
INVENTOR.
JACK G. FISHER Sept. 26, 1967  J. G. FISHER  3,343,288
BLADE LEVEL CONTROL APPARATUS FOR A GRADING MACHINE
Filed March 1, 1965  5 Sheets-Sheet 4
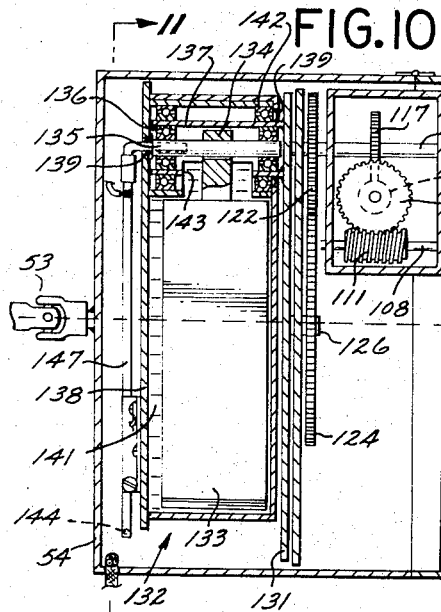
FIG. 10
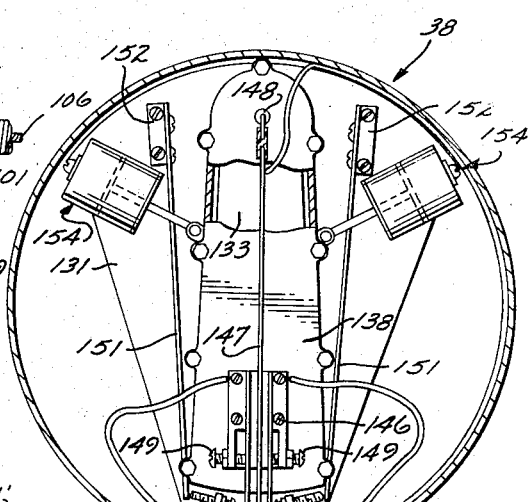
FIG. 11
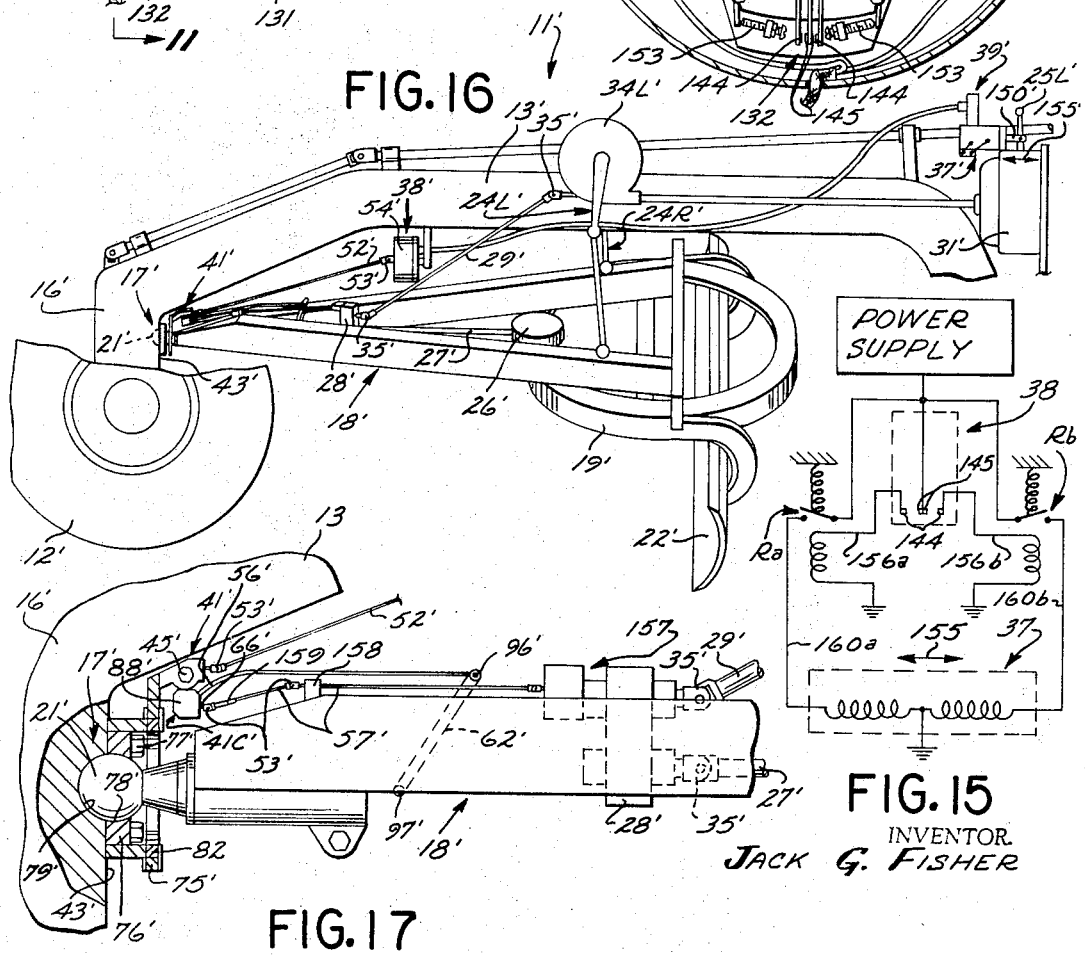
FIG. 16
FIG. 15
FIG. 17
INVENTOR.
JACK G. FISHER

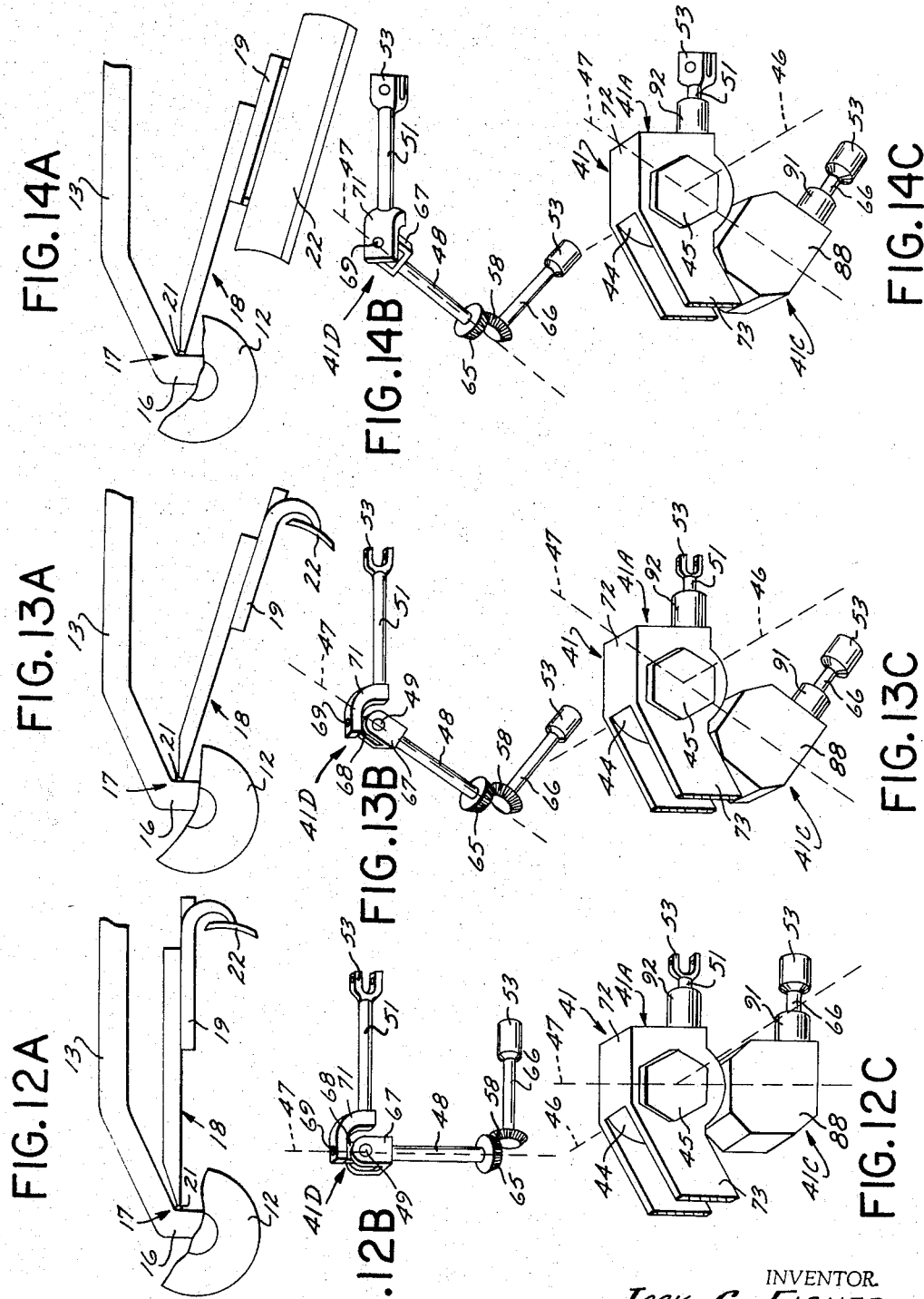

3,343,288
BLADE LEVEL CONTROL APPARATUS FOR A
GRADING MACHINE
Jack G. Fisher, 337 S. Occidental St., Los Angeles,
Calif. 90057
Filed Mar. 1, 1965, Ser. No. 437,007
14 Claims. (Cl. 37—156)

Generally speaking, the present invention relates to blade level control apparatus for a grading machine of the type which is often known as a road grader, although it is not limited to use in grading road surfaces only, but is customarily used to spread and shape dirt and other materials in the course of constructing roads, ditches, foundation sites, and for grading areas for any other purpose. Such grading machines are conventional and are well known in the art and, therefore, the detailed structure thereof will not be illustrated in the drawings and described in great particularity since this would unnecessarily increase the number of drawings and the length of the specification without in any way providing a more adequate disclosure of the real inventive concept of the present invention, which pertains and relates primarily to apparatus for maintaining the horizontal angular position, around a longitudinal fore and aft axis, of the conventional blade carried by such a conventional grading machine, so that an operator can initially select a particular horizontal angle of said blade and can thereafter operate the controls of the machine in a manner such as to positionally move the blade in any desired direction up and down, sideways, or around an axis substantially perpendicular to the length direction of the blade without disturbing or altering the initially selected or preset horizontal angle of the blade with respect to said longitudinal fore and aft axis. Incidentally, in order to simplify the explanation which follows, it should be noted that the expression, horizontal angle, when used with respect to the blade, is intended hereinafter to mean the horizontal angle around said longitudinal fore and aft imaginary axis which passes directly through the conventional swivel connection means or ball and socket joint which mounts the conventional circle frame member carrying the blade behind a depending forward part of a main framework portion of a conventional grader or grading machine.

It will be noted that maintaining the proper horizontal angle of the blade of such a grading machine is a major prior art problem, and various prior art attempts and devices to solve it have been made and/or developed in the past. However, most such prior art devices are extremely complicated and difficult to maintain and have a tendency to break down frequently whereby to require the services of a highly skilled and specialized mechanic, thus causing such a road grading machine to be shut down for substantial periods of time, awaiting repair of the automatic blade control apparatus, which is something a contractor simply cannot afford since time is of the essence in the contracting business.

Furthermore, most such prior art blade angle maintenance or corrective systems have been extremely inaccurate when the blade is to be maintained at an angle or position very much different from a normal horizontal angle or position. In other words, they usually involve progressive and very substantial errors which are functions of the degree of displacement of the blade from a normal neutral level horizontal position, and this is so because of the nature of such prior art blade angle maintenance or correction systems which have a basic fallacy, in that they are usually positioned for operation about pivot points very substantially displaced from the center of pivotal movement of the complete structure carrying the blade and, thus, cannot possibly bring about appropriate corrective action except when the blade angle or displacement from a normal horizontal level position is very slight.

Additionally, most such prior art blade angle maintenance or correction systems are unreliable for the kind of hard service which a grading machine must withstand because their electrical components are affected by heat, dust, and vibration, and need constant vigilance to keep them in proper adjustment and operation condition.

Furthermore, most such prior art blade angle maintenance and corrective systems involve substantial bulk and require the mounting of the apparatus on the conventional road grading machine in locations such as to interfere with, or to partially restrict, many of the normal uses of the conventional road grading machine when not equipped with such a prior art blade angle maintenance or corrective system.

Also, such prior art systems are very costly, but the most important point is the one previously mentioned—that is, that they are not accurate.

The novel blade level control apparatus of the present invention, as opposed to the prior art systems referred to above, is relatively simple and maintenance-free, having components of a nature such as to require very little servicing and to be extremely unlikely to fail even when subjected to the very rough and hard usage which they may expect on a conventional road grading machine.

Furthermore, the apparatus of the present invention most importantly is extremely accurate and virtually completely overcomes the above-mentioned prior art disadvantages, and this is true even with very substantial deflections of the blade from its normal neutral horizontal level position.

Additionally, the apparatus of the present invention does not involve any major amount of equipment that must be so positioned on the road grading machine as to interfere with, or limit, any of its conventional uses in the above-mentioned undesirable manner of said prior art systems intended for the same purpose.

With the above points in mind, it is an object of the present invention to provide a novel blade level control apparatus for a grading machine having any or all of the advantages and/or features referred to herein and embodying any or all of the structures referred to herein, generally and/or specifically, and individually and/or in combination, and which is capable of maintaining the horizontal angular position of the blade of a road grading machine in an extremely accurate and simple manner, and which is of extremely inexpensive, simple-to-install, simple-to-maintain, and simple-to-operate construction such as to be conducive to widespread use thereof.

Further objects are implicit in the detailed description which follows hereinafter (which is to be considered as exemplary of, but not specifically limiting, the invention), and said objects will be apparent to persons skilled in the art after a careful study of the detailed description which follows hereinafter.

For the purpose of clarifying the nature of the present invention, one exemplary embodiment of the complete invention, and certain minor modifications of a portion thereof, are illustrated in the hereinbelow-described figures of the accompanying five sheets of drawings and are described in detail hereinafter.

FIG. 1 is a reduced-size, partially broken away, fragmentary, side elevational view of a road grading machine in somewhat diagrammatic and simplified form and with certain portions of the machine omitted for reasons of simplification and clarity.

FIG. 2 is a fragmentary, partially broken away view of the forward portion of the apparatus of FIG. 1 drawn to a somewhat larger scale than FIG. 1 and with structure carrying the blade slightly rotated in a counterclockwise direction around a longitudinal fore and aft axis as seen from the operator's position.

FIG. 2A is a fragmentary, somewhat diagrammatic, partial top plan view of the right hand portion of the apparatus shown in FIG. 2.

FIG. 3 is another enlargement of a left portion of the apparatus of FIG. 1 drawn to an even larger scale than FIG. 2 and also being fragmentary and partially broken away and with the various portions of the apparatus removed for reasons of drawing simplification and clarity.

FIG. 6 is a fragmentary, partially broken away, enlarged three-dimensional view of certain portions of the apparatus of FIG. 3.

FIG. 7 is an enlarged fragmentary view, substantially along the plane indicated by the arrows 7—7 of FIG. 6, and shows the interior structure of a portion of the simulator means.

FIG. 8 is an enlarged view which is partly in central section, partly in elevation, and partly broken away, showing the blade angle selector and indicator means.

FIG. 9 is a three-dimensional view of a position-responsive, error signal-producing pendulum switch means.

FIG. 10 is an enlarged sectional view substantially on the plane indicated by the arrows 10—10 of FIG. 9.

FIG. 11 is a view taken substantially along the plane indicated by the arrows 11—11 of FIG. 10 with certain portions broken away and in section.

FIG. 12A is a reduced-size, fragmentary, somewhat diagrammatic and schematic view illustrating the blade supporting structure and the blade in a normal neutral horizontal or level position.

FIG. 12B illustrates certain portions of the blade position control apparatus (or simulator means) of the present invention (with certain outside portions removed for clarity), illustrating their relative positions when the blade of the road grading machine is in the position shown in FIG. 12A.

FIG. 12C is a view very similar to FIG. 12B and shows the apparatus with the removed outside portions of FIG. 12B included in FIG. 12C.

FIG. 13A is a reduced-size, fragmentary, somewhat diagrammatic and schematic view illustrating the blade supporting structure and the blade in a downwardly deflected position from that shown in FIG. 12A.

FIG. 13B illustrates certain portions of the blade position control apparatus (or simulator means) of the present invention (with certain outside portions removed for clarity), illustrating their relative positions when the blade of the road grading machine is in the position shown in FIG. 13A.

FIG. 13C is a view very similar to FIG. 13B, and shows the apparatus with the removed outside portions of FIG. 13B included in FIG. 13C.

FIG. 14A is a reduced-size, fragmentary, somewhat diagrammatic and schematic view illustrating the blade supporting structure in substantially the same position as shown in FIG. 13A, but with the blade rotated around an axis substantially perpendicular to the length direction of the blade from the position of the blade shown in FIG. 13A.

FIG. 14B illustrates certain portions of the blade position control apparatus (or simulator means) of the present invention (with certain outside portions removed for clarity), illustrating their relative positions when the blade of the road grading machine is in the position shown in FIG. 14A.

FIG. 14C is a view very similar to FIG. 14B, and shows the apparatus with the removed outside portions of FIG. 14B included in FIG. 14C.

FIG. 15 is a fragmentary, diagrammatic, schematic view illustrating a certain portion of the electrical circuitry.

FIG. 16 is a view similar to FIG. 2, but showing a slightly modified form of the invention.

FIG. 17 is a view similar to FIG. 3 but illustrates the modified portion of the apparatus shown in FIG. 16.

Figure 18:
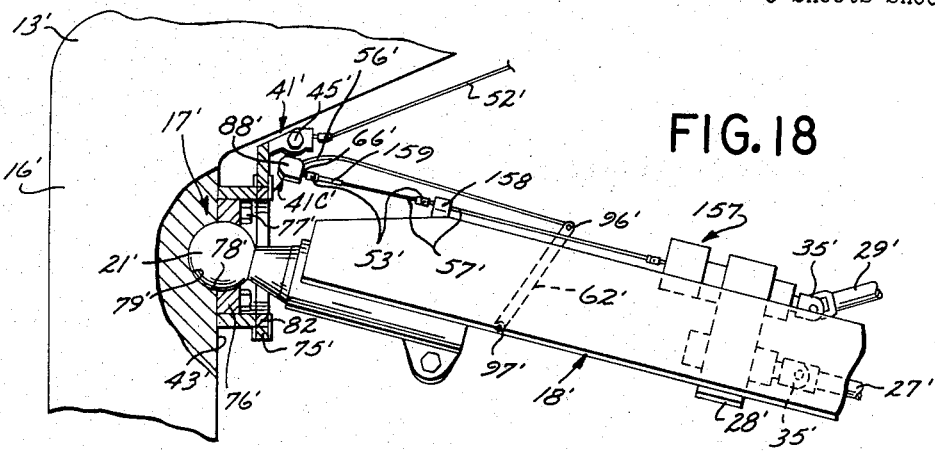
FIG. 18 is a view similar to FIG. 17, but merely illustrates the apparatus when the blade member and supporting structure has been moved down from a horizontal position such as shown in FIG. 17 and also in FIG. 12A and has also had the near side very slightly elevated with respect to the far side thereof.
Figure 4:
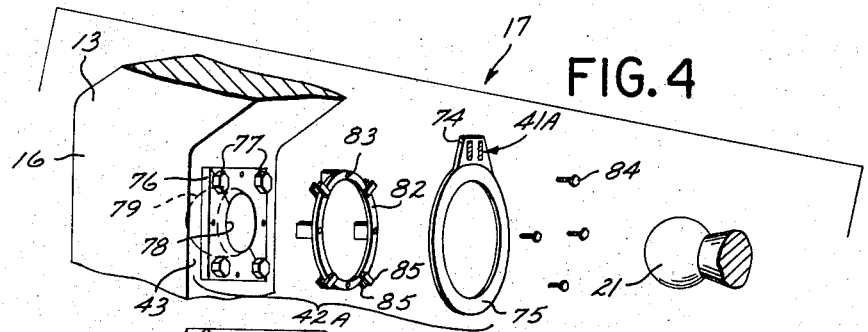
FIG. 4 is a fragmentary, exploded view illustrating the swivel joint means, or ball and socket joint means, mounting the structure which carries the blade of the grading machine.
Figure 5:
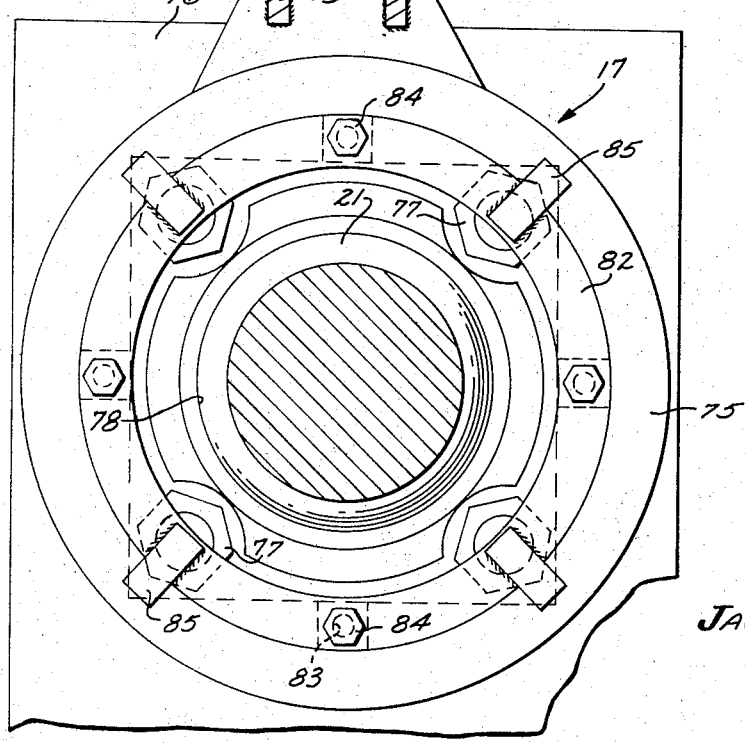
FIG. 5 is an enlarged view taken substantially on the plane indicated by the arrows 5—5 of FIG. 3.

Generally speaking, the apparatus of the present invention is adapted primarily for use on a grading machine such as is generally designated by the reference numeral 11 and which is of a type having a plurality of wheels, such as indicated at 12, carrying a longitudinal main supporting framework means 13 extending forwardly from the powered engine-carrying portion 14, with a seat 15 for an operator or a driver of the vehicle being positioned between the powered engine carrying portion 14 and the forwardly projecting longitudinal main supporting framework means 13. The main supporting framework means 13 has a vertically downwardly depending portion 16 at the forward end thereof which is provided with a rearwardly facing swivel connector means, such as is generally indicated at 17, and which usually takes the form of a ball and socket joint means which is provided with and effectively swivelly interconnects a rearwardly substantially longitudinally directed auxiliary movable frame means, generally designated at 18, which we will refer to hereinafter as the circle frame means since it carries the circle member 19 at the rear end thereof.

The auxiliary circle frame means 18 is illustrated as comprising a triangularly shaped, forwardly converging structure comprising two rearwardly diverging structural members appropriately rigidly interconnected and connected to the ball member 21 of the ball and socket joint 17 at the forward end of said circle frame means 18, thus making it possible to move the circle frame means 18 arcuately up or down or sideways in either direction from a normal neutral level horizontal position such as shown in FIG. 1 and also thus making it possible to rotate the entire circle frame means 18 and the circle member 19 and underlying blade means 22 around a longitudinal fore and aft axis passing forwardly and rearwardly through the exact center of the ball and socket joint or swivel connector means 17, said longitudinal fore and aft axis being indicated in broken lines at 23 in FIG. 3.

Such rotary movement of the circle frame means 18, the circle member 19, and the blade 22 is normally effected by similar left and right individually controllably operable extension and retraction actuator means, such as generally designated at 24L and fragmentarily at 24R in FIG. 2. These two extension and retraction actuator means may be said to comprise a pair of vertical extension and retraction actuator means operable to correspondingly raise or lower the left side of the circle frame means 18 or the right side of the circle frame means 18 in accordance with the operation of a pair of manual control levers 25L and 25R—the arrangement normally being such that movement of the operating lever 25L forwardly causes the left side of the circle frame means 18 to be moved down because of extension action of the left actuator means 24L, while rearward movement of said left lever 25L will cause said left side of the circle frame means 18 to be elevated by reason of retraction movement of the left actuator means 24L. The right actuator means 24R is similarly operated by forward and rearward movement of the corresponding control lever 25R, thus giving a very substantial measure of positional control to the operator.

The conventional road grading machine 11 is also provided with controllably powered driving means for effectively rotating the circle member 19 around an axis substantially perpendicular to the length direction of the blade 22 and which, in the position shown in FIG. 1, would be a substantially vertical axis lying at the center of the circle member 19 and perpendicular to the horizontal plane in which it lies in FIG. 1.

In the conventional road grading machine, the above-mentioned rotation of the circle member 19 is normally accomplished by a geared power transmission unit 26 which may comprise a worm cooperating with a worm wheel, which drives a spur or bevel gear, which drives a corresponding ring gear carried by the ring member 19 (not shown since such is well known in the art), or any other suitable power transmission means adapted to cause the ring member 19 to rotate around its center with respect to the driving power transmission or gear unit 26 and also with respect to the circle frame means 18. In this connection, it should be noted that the power transmission driving unit 26 is carried by the circle frame means 18, while the circle member 19 is rotatively mounted with respect thereto by suitable mounting means (not shown since such are well known in the art and do not touch upon the real inventive concept of the present invention).

Incidentally, it should also be noted that, in the example illustrated, the worm gear or other type of driving unit 26 is driven by a shaft 27 which in turn connects to a power transmission or gear box 28, which is driven by another shaft 29, which is connected to a power take-off unit 31, which in turn is driven from the engine within the powered engine carrying portion 14 of the grading machine 11 under the control of a manually operable lever 32 which, when operated in one direction, will cause driving rotation of the circle member 19 in one direction about its center and which, when operated in the opposite direction, will cause driving rotation of said circle member 19 in the opposite direction.

Incidentally, it should be noted that each of the two previously mentioned vertical extension and retraction actuator means 24L and 24R are also similarly operated through corresponding drive shafts 33L and 33R, such as shown in FIG. 2A, which connect to the power take-off unit 31 and, as previously mentioned, are controlled by the corresponding levers 25L and 25R.

The detailed structure of the circle rotating driving unit 26 is not shown, the detailed structure of the power transmission unit 28 is not shown, and the detailed interior construction of each of the power transmission units 34L and 34R in FIG. 2A, which comprise part of each of the extension actuator means 24L and 24R are not shown, since such arrangements are well known in the art and do not touch upon the real inventive concept of the present invention.

Incidentally, it should be noted that the various drive shafts referred to, such as 27, 29, 33L, and 33R may be provided with connectors, such as indicated in each case by the reference numeral 35, which allow relative lateral bending in any direction in the connector but which do not allow relative rotation around a longitudinal axis of each of said power transmission shafts, as is customary in such arrangements. In other words, it may be said that each of the connectors 35 is of a type which effectively comprises a universal joint means having rotary freedom for movement (at least within the required limits) around two mutually perpendicular axes, both of which are transverse to the longitudinal axis of the driving shaft or the driven shaft. Full and complete showings of all of the interior structural details thereof are not set forth in each instance in the drawings since such structures are well known in the art and do not touch upon the real inventive concept of the present invention. Incidentally, all that has just been said with respect to the universal joint means 35 is equally true with respect to certain generally functionally similar universal joint means 53 which will be referred to hereinafter. Also, it should be noted that all of the various drive shafts just referred to above, such as 27, 29, 33L, 33R, etc., and also referred to later on in the specification as interconnecting the above-mentioned functionally similar universal joint means 53 referred to later on in the specification, may, as needed, be provided with length-compensating or length-modifying linkage means, such as the one designated by the reference numeral 159 in FIGS. 17 and 18, for example, so as to effectively compensate for or allow the necessary modification in the length of the drive shaft connected thereto as required when the circle frame means 18 is raised, lowered, or moved in any manner such as to effectively change the actual distance between opposite ends of the drive shaft, or plurality thereof, carrying such a length-compensating or length-modifying linkage means or of the general character indicated at 159 in FIGS. 17 and 18. Furthermore, it should be noted that, for purposes of drawing simplification and clarity, such a length-compensating or length-modifying linkage, equivalent to that shown at 159 in FIGS. 17 and 18, is not shown throughout the drawings in the various drive shafts which may require same. However, it is to be clearly understood that the present invention and application comprehends and includes the use thereof in all such drive shafts requiring same as fully as if shown in the drawings in complete detail in each such drive shaft, which would, obviously, be redundant and unnecessary in view of the statement made above and in view of the fact that such length-compensating or length-modifying linkages, which allow variation in the length thereof, but which provide positive rotary coupling between the elements thereof, are well known in the art and do not touch upon the real inventive concept of the present invention. Incidentally, with respect to various of said universal joint means 35 and/or 53, it should be noted that no attempt has been made in the various figures of the drawing to correlate the rotary positionings thereof in a manner correponding to the actual positions of the real apparatus. Instead, they are shown in various different positions in different views for the purpose of facilitating the disclosure provided by the drawings.

It should also be noted that a conventional grading machine, such as that generally designated at 11, normally also has additional manually controllably operable actuator means for removing the circle frame means 18, and correspondingly the circle member 19 and blade 22, around a vertical axis passing substantially through the center of the ball and socket joint means 17 and perpendicular to the longitudinal fore and aft axis 23 shown in FIG. 3, such a vertical axis of rotation being indicated in broken lines by the reference numeral 36 in FIG. 3. However, since such lateral movement controlling actuator means are well known in the art and since the apparatus of the present invention does not in any way cooperate therewith or modify the operation of same, such lateral movement control actuator means and the manual control lever for same are not shown in the drawings for reasons of drawing simplification and clarity.

Incidentally, it should be noted that when the road grader has such a lateral movement controlling actuator means as that referred to in the preceding paragraph and not shown in the drawings for the reasons set forth in the preceding paragraph, it is also necessary to effectively interconnect the previously mentioned left and right extension and retraction actuator means 24L and 24R with respect to the circle frame means 18 in a manner such as to allow such lateral movement of said circle frame means 18. This may be done by any of a number of well known expedients, such as providing laterally directed slidable mountings of said left and right actuator means 24L and 24R, at the tops thereof with respect to the main frame 13 or at the bottoms thereof with respect to the side members of the circle frame means 18 so as to allow such relative lateral movement of the circle frame means 18, or such mountings may be pivotal, allowing lateral pivotal movement rather than lateral sliding movement. Since such mounting arrangements for effectively interconnecting the left and right actuator 24L and 24R to the circle frame means 18 in a manner such as to allow relative lateral movement of the circle frame means 18 are well known in the art and do not touch upon the real inventive concept of the present invention, such mounting arrangements are not illustrated in the drawings or described in detail in the specification since it is believed that this would merely comprise unnecessary surplusage.

If we assume that an operator of the grading machine 11 wishes to maintain a true horizontal position (or any selected horizontal angular displacement therefrom) of the blade 22 irrespective of whether he raises or lowers same or moves it from side to side or rotates it around the center of the circle member 19 during an extensive grading operation, it will be understood that this can be very readily done by providing an automatic control to control one of the two levers 25L and 25R for correspondingly controlling one of the two vertical extension and retraction actuator means 24L and 24R so as to maintain the corresponding end of the blade 22 (that is, either the left or right end thereof) in exactly the same angular relationship with respect to the other end of said blade 22 as is initially selected by the operator and irrespective of any repositioning movements of the blade 22 effected by the other controls and actuators or powered driving means previously referred to. In the example illustrated, this is done by providing servomotor means (which, in the example illustrated, is of a linear action or translatory motion type), generally indicated at 37, which is effectively coupled in controlling relationship with respect to said previously mentioned left lever member 25L which controls the vertical extension and retraction of the left actuator means 24L, while leaving the right lever member 25R free for manual operation by the operator of the grinding machine.

It is apparent that the above-described arrangement will allow the operator to raise or lower the right side of the circle frame means 18 by corresponding movement of the right lever member 25R and that, when this occurs, the initially selected horizontal angle of the blade member 22 will be maintained by the apparatus of the present invention, which will correspondingly move the left lever member 25L in a manner such as to maintain the initially selected horizontal angle of the blade member 22.

The servomotor actuator means 37 is controlled by a rotary positioning responsive pendulum switch means unit, generally designated by the reference numeral 38, which produces an electrical signal of the proper sense for correspondingly operating the servomotor means 37 to properly position the left control lever 25L to maintain the blade 22 in a particular horizontal angular relationship, as selected by the blade position selector and indicator means, generally designated by the reference numeral 39. Said electrical output signal of the proper sense, produced by the rotary position responsive pendulum switch means 38, occurs in correspondence with the output from a blade position simulator means, generally designated by the reference numeral 41, which is effectively coupled with respect to the circle frame means 18 and the circle member 19 so as to respond to any movement producing error in the horizontal angular position of the blade 22 around the longitudinal fore and aft axis 23 from that initially selected by the blade position angle selector and indicator means 39.

It will be understood that the arrangement is such that the circle frame means 18 and the blade 22 can be moved to any desired position in any direction, after an initial horizontal angle is selected by operating the blade angle position selector and indicator means 39 into a selected blade angle designation, and the blade 22 will automatically maintain the corresponding horizontal angular position, thus allowing the operator to raise, lower, and otherwise move the blade 22 during a grading operation without any necessity of constantly trying to correct and/or maintain the desired horizontal blade angle, since the apparatus of the present invention will do this automatically.

The previously mentioned blade-position simulator means generally indicated at 41, in the exemplary first form of the invention illustrated, comprises what might be termed first, second, and third simulator means portions which are mutually perpendicularly rotatively interconnected with respect to each other for relative rotation about three substantially mutually perpendicular axes so that an output portion of said simulator means will effectively at all times substantially simulate the position of the blade 22 of the grading machine and can be used for control purposes of the above-mentioned type by way of the rotary position responsive pendulum switch means generally designated at 38, the blade position selector and indicator means generally indicated at 39, and the linear action servomotor actuator means generally indicated at 37 as described in general terms hereinabove.

In the exemplary first form of the invention, said first, second, and third simulator means portions are designated by the reference numerals 41A, 41B, and 41C. It will be noted that the first simulator means portion 41A is effectively provided with first rotary mounting means, generally designated at 42A, which effectively mounts said first simulator means portion 41A and, in fact, the complete simulator means generally designated at 41, on a rear surface 43 of the previously mentioned depending portion 16 of the main framework means 13 of the grading machine 11 for rotation about the previously mentioned longitudinal fore and aft imaginary axis 23 passing centrally through the center of the swivel connector comprising the ball and socket joint generally designated at 17.

It will also be noted that said first and second simulator means portions 41A and 41B are effectively provided with, and relatively rotatively interconnected by, a second rotary mounting means generally designated at 42B (as best shown in FIG. 7), for effectively relatively rotatively mounting same for rotation around a second imaginary axis which is concentric with the tube 44 comprising a part of said rotary mounting means 42B and normally carried at the uppermost end of said second simulator means portion generally designated at 41B, said imaginary axis lying on the center line of the pair of end closure plugs 45 and being shown in broken lines at 46 in FIGS. 12C, 13C, and 14C. It will be noted that said second imaginary axis 46 is normally horizontal when the blade 22 is horizontally positioned as shown in FIG. 1 and is perpendicular to said first-mentioned longitudinal fore and aft axis 23 and, in the exemplary form of the invention illustrated, is very slightly rearwardly offset from the center of the swivel connector means comprising the ball and socket joint generally designated at 17.

It will be noted that the second and third simulator means portions 41B and 41C are effectively provided with and effectively rotatively interconnected by a third rotary mounting means, generally designated at 42C (best shown in FIG. 7) effectively relatively rotatively mounting said second and third simulator means portions 41B and 41C for rotation around a third auxiliary imaginary axis which is substantially perpendicular to both of the previously mentioned imaginary axes 23 and 46. It will be noted that, in the example illustrated, said third auxiliary imaginary axis is indicated in broken lines at 47 (as best shown in FIG. 7) and at all times is concentric with the longitudinal axis of the shaft 48 which is clearly shown in FIGS. 7, 12B, 12C, 13B, 13C, 14B, and 14C. It will be noted that normally when the blade 22 of the grading machine 11 is in a horizontal position, such as is shown in FIG. 1, the previously mentioned second imaginary axis 46 is horizontal, while the third imaginary axis 47 is vertical and is also slightly rearwardly offset from the center of the swivel connector means comprising the ball and socket joint 17 in substantially the same manner as the previously mentioned small rearward offset of the second imaginary axis (normally horizontal) indicated at 46 in FIGS. 12C, 13C, and 14C.

It should also be noted that the simulator means 41 is provided with an output blade-position-simulating portion operable in response to the relative positioning and displacements of said simulator means portions and effectively provided with and coupled with respect to the previously mentioned rotary position responsive error signal-producing pendulum switch means, generally designated at 38, for causing a corrective electrical output error signal of the proper sense to be produced thereby in response to departure of the position of the blade means 22 from a desired horizontal angular position with respect to said first-mentioned longitudinal imaginary axis 23 (which shall also mean any similar longitudinal axis lying in the same vertical plane but at any vertical level or angle with respect to the center of the ball and socket swivel connector joint means 17); said corrective electrical output error signal being then adapted to be fed to the previously mentioned servomotor actuator means 37 for causing same to control the handle 25L in a manner such as to reposition the left or near end of the blade 22 so as to lie in a desired horizontal angular relationship, as initially selected on the blade angle position selector and indicator means generally designated at 39.

In the exemplary form of the invention illustrated, said output portion of said simulator means is generally designated by the reference numeral 41D, and the horizontal pivot pin 49 thereof at all times assumes a position simulating that of the blade 22 and correspondingly controls rotation of the output shaft 51, which is linked by coupling and linkage rod member 52 to the input side of said previously mentioned rotary position responsive error signal producing pendulum switch means 38, said connection being by way of two universal joint means 53, each having rotary freedom for movement (within required limits) around two mutually perpendicular axes, both of which are transverse to the longitudinal axis of the driving shaft or the driven shaft; one such type of universal joint means comprising the yoke type clevis structure indicated at 53 in FIG. 6, which allows transverse pivotal displacement of the axis of the linkage member 52 with respect to the axis of the output shaft 51 in any direction, but which provides positive rotary coupling relative to the longitudinal axis of each of same so that rotation of the output shaft 51 of the simulator means 41 will cause corresponding rotation of the exterior housing member 54 of said rotary position responsive pendulum switch means 38.

It should also be noted that the position of the output portion 41D of the simulator means 41 is also modified by effective rotary position transmitting means connected with respect to said output portion 41D of the simulator means 41 and responsive to any horizontal angular deviation of the blade 22 resulting from relative rotation of the previously mentioned circle member 19 and the blade 22 carried thereby occurring as a result of driving operation of the previously mentioned rotating driving unit 26 (which usually comprises gear means coupled to the ring or circle member 19).

In the exemplary first form of the invention illustrated, said effective rotary position transmitting means is generally designated by the reference numeral 55 (as best shown in FIG. 6) and takes the form of an exterior hollow torque tube 56 carrying an interior flexible drive shaft 57 and a pair of bevel gears 58 and 59 at opposite ends thereof, with the bevel gear 59 being in driven relationship with respect to another bevel gear 61, which is pivotally connected by a pair of mounting straps 62 with respect to a central crossbar member 63 extending across the diameter of the circle member 19 whereby to be rotated therewith whenever the driving unit 26 is energized by the operating lever 32 and rotates the circle member 19 around a substantially central axis parallel to the previously mentioned third imaginary axis 47.

When such rotation of the circle member 19 occurs, the bevel gear 61, which is relatively rigid with respect to the block member 64, effectively rotates around its vertical longitudinal axis and thereby necessarily drives and rotates the bevel gear 59, the flexible shaft 57, and the other bevel gear 58 at the opposite end of said shaft 57 which, in turn, drivingly rotates the bevel gear 65 carried at the bottom end of the previously mentioned rotary shaft 48, which similarly rotates the output portion 41D of the simulator means 41 and which, therefore, causes a corresponding modification of the rotary position of the output shaft 51 thereof if, and only if, said rotation of the circle member 19 has caused the blade 22 to change its horizontal angular position relative to the longitudinal fore and aft axis 23. In this connection, it is extremely important to note at this point that, while the rotation of the four bevel gears 61, 59, 58, and 65, and of the corresponding shafts 57, 66, and 48 occurs whenever the circle member 19 rotates around its central axis, the transmission of rotary output motion to the output shaft 51 as a result of rotation of the shaft 48, occurs only when said rotation of the circle member 19 produces a horizontal angular displacement of the blade 22 and produces no output of the output shaft 51 of the simulator means 41 when rotation of said circle member 19 does not effectively change the horizontal angle of the blade member 22. This is so because of the nature of the simulator output portion 41D which is perhaps best shown in FIGS. 12B, 13B, and 14B, wherein it will be seen that said simulator means output portion 41D comprises a yoke 67 rigidly carried at the upper end of the shaft 48 and having the previously mentioned rotatable transverse pivot pin 49 extending thereacross and pivotally mounting a block or tongue member 68 therein for rotation around the axis of said normally horizontal pivot pin 49, with the outer end of said rotatable block or tongue member 68 having an integral pivot pin 69 projecting outwardly therefrom and being rotatably mounted in the upper portion of an arcuate coupling member 71 which has its opposite end rigidly attached to the previously mentioned output shaft 51. It is obvious that when the shaft 48 rotates, in correspondence to the previously mentioned rotation of the ring member 19 and blade 22, about an axis parallel to the axis of said shaft 48, and when the apparatus is in a position such as is shown in FIGS. 1 and 12A, 12B, and 12C, no additional rotation of the output shaft 51 will occur in response to rotation of the ring member 19 and blade member 22 since all that will happen will be rotation of the pivot pin 69 in the aperture in the upper portion of the arcuate member 71 and no corresponding rotation of the output shaft 51 of the simulator means 41 will occur as a result thereof.

It will be noted that this is correct, since any rotation of the circle member 19 and the blade member 22 while the apparatus is in the position shown in FIGS. 1 and 12A will not cause either end of the blade member 22 to be effectively raised or lowered relative to the other end. In other words, rotation of the circle member 19 and the blade member 22 should produce no modification of the rotary position of the output shaft 51 of the simulator means 41, and it does not do so, as just described.

However, when the circle member 19 and the blade member 22 are merely directly lowered from the position shown in FIG. 12A into a position such as is shown in FIG. 13A, the situation is somewhat changed because it will be understood that rotation of the circle member 19 and of the blade member 22 around the center of the circle member 19 will correspondingly elevate one end of the blade member 22, while lowering the other end as is clearly shown in FIG. 14A. Therefore, when the apparatus is in the position of FIG. 13A, the previously mentioned rotary position transmitting means 55 should produce a modification of the rotary position of the output shaft 51 of the simulator means 41, and it does so as is clearly shown in FIGS. 13B and 14B. It will be noted that rotation of the shaft 48 in response to rotation of the circle member 19 and blade member 22 will now cause the yoke member 67 to rotate the pivot pin 69 around the previously mentioned third imaginary axis 47 since the position of the pivot pin 69 is now offset therefrom while, when in the previous position of the apparatus as shown in FIG. 12B, it was coincident therewith and not offset therefrom. The fact that said pivot pin 69 is now offset from said imaginary axis 47, when the apparatus is in the position shown in FIG. 13B, causes rotation of the shaft 48 to produce corresponding rotation of the arcuate member 71 and output shaft 51 into the positions shown in FIG. 14B. Thus, it will be understood that when the circle member 19 and blade 22 are in a position such as shown in FIG. 13A, rotation of the circle member 19 and blade member 22 around the central axis of the circle member 19 (which, incidentally, is parallel to the imaginary axis 47 shown in FIG. 13B) will definitely produce a modification of the rotary position of the output shaft 51 corresponding to the degree of horizontal angular displacement of the blade member 22 produced thereby, as is clearly shown in a comparative way in FIGS. 14A and 14B.

The previously mentioned rotary position transmitting means indicated generally at 55 may also be said to effectively include, or be provided with, torque transmission means effectively connected with respect to the third simulator portion 41C for causing it to be rotated around all three of said previously mentioned imaginary axes 23, 46, and 47, in response to corresponding movement of the entire circle frame means 18 (and, of course, also the blade member 22) around the center point of the ball and socket joint means 17. In the exemplary first form of the invention illustrated, said torque transmission means comprises the rigid hollow torque tube coupling and linking means 56 carrying the previously mentioned flexible drive shaft 57 therein, and it will be noted that said torque tube 56 operates to cause appropriate rotation of the output shaft 51 of the simulator means 41 in response to any of such movements of the complete circle frame means 18 which will cause corresponding deviation in an initially selected horizontal angular position of the blade member 22—this being by way of the previously described novel output portion 41D of the simulator means 41.

In the exemplary form of the simulator means 41 and of the associated elements and apparatus comprising same and connected to same, certain specific constructional details are exemplified in FIGS. 1 through 14C illustrating same, although the invention is not specifically so limited in all forms thereof. However, for purposes of complete clarity, said constructional details will now be described in greater particularity.

It will be noted that, in said exemplary form, the first simulator means portion, generally designated at 41A, includes a hollow housing portion 72 which has a pair of angularly downwardly and forwardly directed bifurcated or yoke elements 73 which are welded or otherwise affixed at their front ends to a radially projecting tab portion 74 of a ring member 75.

Said previously mentioned first rotary mounting means 42A comprises a base plate 76 which is adapted to be fastened by suitable fastener means 77 to the rear surface 43 of the depending portion 16 of the main framework means 13, said plate 76 having an aperture 78 which communicates with the interior socket recess 79 which is adapted to retain the ball member 21 therein, whereby to comprise the previously described ball and socket joint means 17. A second ring member 82 is adapted to be fastened to said plate member 76 through suitable fastening apertures 83 by fastening screws 84, with the previously mentioned ring member 75 freely rotatively mounted between spaced radially outwardly projecting tabs 85, thus providing an arrangement such that the outer ring member 75, the tab member 74, and the yoke member 73 are all freely rotatively mounted around the previously mentioned longitudinal fore and aft axis 23. This, of course, also freely mounts the complete first simulator means portion 41A for such rotation.

The hollow housing member 72 freely rotatively mounts the previously mentioned horizontal tube member 44 therein for rotation around the previously mentioned second imaginary axis 46 and fixedly carries the depending sleeve portion 86, which comprises a part of the previously mentioned second simulator means portion 41B. Said depending sleeve portion 86 extends rotatively through an aperture 87 in the top of a lower hollow housing portion 88, which comprises the exterior of said previously mentioned third simulator means portion 41C and is there rotatively retained by an outwardly directed flange 89. The previously mentioned shaft 48 is rotatively mounted within the sleeve 86, while the previously mentioned driving bevel gear 58 is connected to the input shaft 66, which is freely rotatively mounted in a normally horizontal input sleeve 91. Said shaft 66 has a universal joint type connection means 53 which may, if desired, be similar to that previously described in connection with the upper or output shaft 51, which is similarly rotatively carried by an output sleeve 92. Outer ends of the tube 44, which effectively comprises a part of the second rotary mounting means 42B, may be closed off with a pair of similar threaded closure members having heads such as previously referred to and designated by the reference numeral 45.

It should be noted, referring to FIG. 6, that a sleeve 93 encloses a shaft (not shown) of the bevel gear 61, which is integral with respect to the block member 64, and that said sleeve 93 is such as to allow relative rotation around the axis of the bevel gear 61 of the block member 64 and the housing member 94 carrying the bevel gears 59 and 61 therein. On the other hand, another sleeve 95 rigidly interconnects said housing 94 and the torque tube 56, while allowing relative rotation of the bevel gear 59 and the flexible drive shaft 57 therewithin. It should be noted that the block or bracket member 64 is pivotally connected by the pivot pin 96 with respect to the top ends of the pair of spaced linkage members 62 and that another lower pivot pin 97 similarly pivotally connects the bottom ends of said linkage members 62 with respect to an intervening bracket member 98, which is fixedly attached to said previously mentioned cross mounting member 63 carried by the circle member 19.

It should be noted that the distance from the previously mentioned second imaginary axis 46 to the center of the pivot pin 96 is substantially the same as the distance from the center of the ball and socket joint 17 to the center of the lower pivot pin 97 and that the distance between said second imaginary axis 46 and the center of the ball and socket joint 17 is substantially the same as the distance between the upper and lower pivot pins 96 and 97, thus substantially defining a parallelogrammic linkage, which provides the correct type of movement, always causing the third simulator means portion 41C to remain in a predetermined substantially parallel relationship with respect to the circle frame means 18.

The previously mentioned rotary, position responsive, error signal producing pendulum switch means, generally indicated at 38, has an input universal joint type of connector means 53 similar to that of the output shaft 51 of the simulator means 41 and has pivotally connected thereto the output end of the linkage rod or member 52 which will rotate, as previously described in detail, in exact correspondence with deviation from a selected initial horizontal angular position of the blade member 22 of the grading machine 11. Since the input connector means 53 is rigidly connected to the exterior housing 54 of the rotary position responsive means, generally designated at 38, it will be understood that said exterior housing 54 will be rotated around a true central longitudinal fore and aft axis, such as is indicated in broken lines at 99 in FIG. 10, in exact correspondence with horizontal angular deviation of the blade means 22 from an initially selected position. This action is permitted by the rotary bearing means 100 carried by the bracket means 101 which mounts the entire rotary position responsive means 38 under a portion of the main framework means 13, as is best shown in FIGS. 2 and 9.

Since the rotary position responsive means 38 of FIGS. 10 and 11 is intended to produce an electrical error signal corresponding to any horizontal angular deviation of the blade member 22 from a selected desired horizontal angular position, as selected by the previously referred to selector means 39, the connection of said selector means 39 to the position responsive error signal producing means 38 will now be described.

Said selector means 39 is best shown in FIG. 8 and comprises a driving electric motor of a reversible type, indicated at 102, which is provided with reversible "Left" and "Right" pushbutton type, normally open control switch means, as generally indicated at 103, positioned for convenient access and operation by a driver or operator of the grading machine 11 so that he may electrically energize the electric motor means 102 in either direction. It will be noted that said electric motor means 102 has an output shaft extending completely therethrough and coming out opposite ends thereof and is there coupled by appropriate coupling means 104 with respect to the selector and indicator means 39 and at the opposite end by similar coupling means 105 with respect to the flexible drive shaft 106 which is drivingly connected through another coupling member 107 to the input shaft 108 of the previously mentioned position responsive error signal producing means 38 shown in FIGS. 10 and 11 whereby to similarly drive the similar input shafts 109 of the selector means 39 and 108 of the position responsive means 38, which in turn similarly drives the corresponding worms 110 and 111 and the corresponding worm wheels 112 and 113, which in turn drive similar corresponding worms 114 and 113, which in turn drive similar worm wheels 116 and 117, whereby to drive the corresponding shafts 118 and 119 and corresponding small spur gears 121 and 122 and corresponding large spur gears 123 and 124 in exact synchronism. It will be noted that each of the two gear sets just described in detail comprises a similar reduction gearing of perhaps 3200 to 1 input-to-output ratio with respect to the corresponding output shafts 125 and 126, respectively. It will be noted that the shaft 125 of the selector means 39 drives a rotary indicator pointer or index member 127 which is adapted to cooperate with the outer surface 128 of the housing 129 of the selector means, which may be appropriately marked off in angles of deviation from a true horizontal position and which indicate the selected angular deviation of the blade member 22 which the operator of the machine desires to attain and maintain until a subsequent resetting of the index or pointer member 127 by operation of the switch means 103 and the reversible driving motor means 122 in the appropriate direction and to the appropriate extent for positioning the index or pointer member 127 at any other selected angular position in which the operator desires the blade member 22 to be subsequently positioned and maintained.

The other similarly driven shaft 126 of the error signal producing means 38 rotates a pendulum switch assembly mounting plate member 131, which carries the complete pendulum switch assembly or means generally designated at 132 for rotation around the previously mentioned longitudinal axis 99 in exact correspondence with rotation of the previously mentioned index or pointer member 127 of the selector means 39, by which the operator selects a desired horizontal angular position for the blade member 22. In other words, whenever the operator closes the switch means 103 in the appropriate manner for corresponding energization of the electric motor means 102 and produces rotation of the index or pointer member 127 into a selected angular position in which he wishes to position and maintain the blade member 22, the mounting plate 131 and the entire pendulum switch assembly or means 132 will be rotated into a corresponding angular position around the axis 99.

The pendulum switch assembly or means 132, in the exemplary form illustrated, comprises a pendulum means or member of substantial mass, indicated at 133, which has an upper apertured mounting tab portion 134 carried on a transversely directed pivot pin 135 which is mounted in rotary ball bearing means 136 within a transversely directed tube 137 which is fixed to said rotary mounting plate 131 at its right end as viewed in FIG. 10. The depending pendulum member 133 also has an enclosing case means 138 which completely encloses the pendulum means 133 and which is effectively provided with oil seals at all necessary sealing locations, as indicated in part by the reference numerals 139 so as to make it possible to position a damping oil or fluid, best shown at 141 in FIG. 10, within the enclosing case means 138 and completely surrounding the pendulum means 133 for purposes which will be described hereinafter. Of course, it should be noted that the mounting tube 137 has a lower cut-out or aperture 143 to allow the upwardly projecting tab 134 of the pendulum to extend upwardly therethrough into mounting engagement on the previously mentioned transverse pivot pin 135.

It should be noted that the upper end of the enclosing case 138 is independently rotatably mounted with respect to said rigid horizontal mounting tube 137 by exterior ball bearing means 142 positioned between the exterior of said mounting tube 137 and corresponding portions of the enclosing case means 138 and that the previously mentioned oil seals designated at locations 139 effectively seal all possible leakage points to positively retain the interior damping fluid 141 within the case 138.

The pendulum switch means 132 additionally includes a pair of spaced switch contact members 144 effectively comprising what might be termed first switch element means, and also include an intermediate effectively doubled switch contact member 145 which may be said to comprise second switch element means relatively rotatable with respect to said first switch element means for electrically engaging one or the other of the contact members 144 thereof in response to relative rotative angular displacement of said first and second switch element means in either direction and also corresponding to the direction of error or angular departure of the blade 22 of the grading machine 11 from a desired horizontal angular position with respect to the previously mentioned longitudinal imaginary axis 23.

In the exemplary form illustrated, said second switch element means, comprising the pair of switch contact members 144, is effectively fastened to the previously mentioned enclosing case means 138 by suitable fastening means as indicated at 146, and said second switch contact means 145 is effectively carried by a rod member 147 which has its upper end rearwardly directed through an aperture 148 into coupled relationship with respect to the previously mentioned horizontal pivot pin 135 for simultaneous rotation with the previously mentioned pendulum member 133.

It will be noted that adjusting means 149 are provided for adjusting the spacing and positioning of each of the two switch contact elements 144. It should also be noted that a pair of centering spring means 151 are provided and are fixedly attached, as indicated at 152, to the previously mentioned rotatable plate 131 and act to normally center the position of the previously mentioned enclosing casing means 138. Also, threaded adjusting means 153 are provided for adjusting the position of the lower ends of said centering springs 151, and shock absorber means 154 (which are indicated exteriorly only since such are well known in the art) are provided for absorbing shock produced in the event of lurching movement of the entire grading machine 11 being inadvertently imparted to the interior enclosing case 138.

It should be noted that the interior enclosing case 138 has the same period of oscillation as the inner pendulum means 133, thus causing them to oscillate in substantially similar or identical fashions in the event that the grading machine 11 strikes some object or inadvertently lurches and imparts an undesired movement to both the interior enclosing case means 138 and the pendulum means 133 carried therein. This similar period of oscillation will tend to prevent undesired closure of the first and second electrical switch contact means 144 and 145. Also, the inner damping oil or fluid 141 will further tend to minimize any relative movement between the inner pendulum member 133 and the enclosing case member 138 during such inadvertent lurching movement, and the shock absorbing means 154 will take up any major displacement shock caused by such lurching movement and will tend to return the entire rotatable assembly 132, comprising the rotatable plate 131, the case 138, and the pendulum member 133, to its normal vertical null position as shown in FIG. 11. This action is, of course, aided by the centering springs 151.

It will be noted that normally when the error signal producing means 38 is not producing an error signal, the second switch contact or element 145 is in a vertical central null position between the two electrical contact members 144 of said first switch means and, therefore, no electrical output error signal is produced by the apparatus 38. This normal null position is shown in both FIGS. 10 and 11. However, it must be remembered that, as previously described, when the selector means 39 is energized by the control switch means 103 and driving electric motor 102 so as to rotate the index or pointer means 127 into a new selected horizontal angular position for the blade means 22 to subsequently assume and maintain, the rotary plate 131 and the entire pendulum switch assembly or means 132 of FIGS. 10 and 11 are similarly angularly rotated around the longitudinal axis 99. This, of course, causes both the enclosing case means 138 and the inner pendulum switch member 133 to be similarly angularly displaced, and the weight of the inner pendulum member 133 will cause the exterior rod 147 carrying the second switch element means 145 to then be rotatively angularly displaced, under the action of gravity, downwardly back toward its previous null position, as best shown in FIG. 11, and will, thus, cause said doubled intermediate switch contact element 145 to engage one of the two spaced contact members 144 (actually, the underneath one when in said rotatively angularly displaced position). This will correspondingly close the electric circuit portion 160a or 160b, by way of relay Ra or Rb in corresponding relay circuit portion 156a or 156b, as clearly shown in FIG. 15, which will energize the previously mentioned linear or translatory servomotor actuator means 37 in a direction such as is shown by the arrow 155 and which will cause the previously mentioned left vertical extension and retraction actuator means 24L to elevate or lower the left side of the circle frame means 18 (and, of course, also the left side of the blade member 22) to a degree such as to cause corresponding repositioning of the previously mentioned output portion 41D of the simulator means 41 which will in turn cause an exactly corresponding and opposite rotation of the output shaft 51 thereof, the linkage member 52, the connection means 53, and the complete exterior housing 54 of the error signal producing means 38 to a degree such as to exactly return the previously interiorly and oppositely angularly rotated plate 131 and pendulum switch assembly or means 132 to the vertical neutral or null position shown in FIGS. 10 and 11.

In other words, the assumption of the blade member 22 of the proper horizontal angular position corresponding to that selected and indicated by the pointer member 127 of the selector means 39 rotates the entire exterior housing 54 of the error signal producing means 38 into a position such as to return the complete inner pendulum switch assembly or means 132 to the previous and normal vertical null position as is clearly shown in FIGS. 10 and 11 and such as to cause the error signal to no longer be produced, since the intermediate second electrical contact member 145 will assume and maintain the null position best shown in FIG. 11 as long as the blade member 22 retains the selected horizontal angular position.

However, if the operator of the grading machine 11 operates any of the other controls in any of the various permissible ways for raising or lowering the entire circle frame means 18, for moving it to either side, or for rotating the circle member 19 around its center of rotation, and if any of these operations result in changing the horizontal angular position of the blade member 22, corresponding output will be produced by the output shaft 51 of the simulator means 41 and will correspondingly rotate the exterior housing 54 of the error signal producing means 38 so that now the interior rotary plate 131 and pendulum switch assembly or means 132 will no longer be in the vertical or null position best shown in FIG. 11, but will be slightly rotatively angularly displaced and will cause the second switch element 145 to contact the appropriate one (appropriate for correction purposes) of the pair of contact elements 144 whereby to close the appropriate one of the two corrective electrical circuit means 156a, or 156b, respectively, for correspondingly operating the appropriate relay means Ra or Rb, respectively, and correspondingly operating the actuator means 37 whereby to correspondingly move the left control handle 25L in a manner such as to raise or lower the left end of the blade member 22 until the entire blade member 22 has been returned to the horizontal angle initially selected by the position of the index or pointer member 127 of the selector and indicator means 39.

The servomotor actuator means 37 may comprise any suitable type of actuator means capable of operating the lever means 25L in either direction. For example, it may comprise a reversible motor, generally similar to that previously shown at 102, driving a worm gearing set similar to any of the worm gearing sets disclosed in FIGS. 8 and 10 such as, for example, the worm 111 and worm wheel 113 of FIG. 10, as exemplary of such an arrangement with the worm wheel in turn driving a rotary pinion which in turn drives a longitudinal rack member comprising the output connecting rod portion 150 which is effectively coupled to the lever 25L. This would be an advantageous arrangement since such a worm gear transmission will operate in either direction and yet will hold any position once the motor driving same is de-energized. On the other hand, what are known in the art as push-pull and position-holding solenoids, or any other suitable type of actuator means may be employed in lieu thereof.

FIGS. 16–19 illustrate a very slight modification of a portion of the apparatus of the present invention and because of the similarities, similar parts are indicated by similar reference numerals, primed, however. In this modification, it will be noted that the means for effectively coupling the circle member 19 of the first form of the invention with respect to the simulating means 41 thereof, which means of the first form of the invention is best shown in FIG. 6, is modified in the version thereof shown in FIGS. 16–19—all other parts being substantially identical to those of the first form of the invention illustrated in the other figures of the drawings and previously described in great detail herein, and which, therefore, will not again be described in connection with this modification of just said portion of the earlier form of the invention illustrated in FIG. 6. In other words, in this modification there is a torque tube 56′ which is in many respects equivalent to the torque tube 56 of the first form of the invention as illustrated in FIG. 6 and is intended to appropriately reposition the third simulator portion 41C′ in substantially the same manner as the positioning operation of the torque tube 56 with respect to the third simulator portion 41C of the earlier described form of the invention as illustrated in FIG. 6. However, in the modified form illustrated in FIGS. 16–19, said torque tube 56′ is rigidly connected to the hollow portion 88′ of the third simulator means portion 41C′ at a slightly different location from, and substantially above, that of the earlier form illustrated in FIG. 6 and does not contain therein any flexible drive shaft corresponding to that shown at 57 in FIG. 6. Furthermore, the rear end of said modified torque tube 56′ is pivotally connected, as indicated at 96′, to the upper end of mounting strap means 62′ equivalent to those shown at 62 in FIG. 6, but which, if desired, may comprise a single strap rather than a pair thereof and which, in contrast to the showing of FIG. 6, is pivotally mounted at the lower end, as indicated at 97′, with respect to the circle frame means 18′ rather than with respect to the cross member 63 carried by the circle member 19 as in the earlier form of this portion of the invention as illustrated in FIG. 6. Of course, the parallelogrammic positioning of the second axis of rotation (similar to that designated at 46 in the first form of the invention) lying on the center line of the threaded cap member 45′, the upper pivot pin 96′, the lower pivot pin 97′, and the exact center of the ball and socket joint 17′, is still retained in this modified form of the invention.

In this modified form it will be noted that a different means is provided for rotating the input shaft 66′ for the same purposes as that described in detail hereinbefore in connection with the input shaft 66 of the earlier form of the invention, as best shown in FIG. 7, FIG. 12B, FIG. 13B, and FIG. 14B. In this modified arrangement, said driving means comprises shaft portions 57′ and reduction gearing means 157 driven by a power transmission gear box unit 28′ which corresponds to the previously mentioned gear box 28 of the first form of the invention and which, it will be recalled, simultaneously operates the drive unit 26′ which rotates the circle member 19′ and the underlying blade member 22′.

Figure 19:
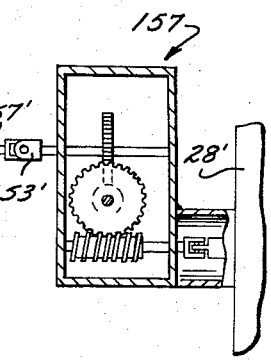
FIG. 19 is an enlarged, fragmentary view comprising substantially a central plane, sectional view illustrating the reduction gearing means employed as a part of the coupling means in the modified portion of the apparatus of the invention as illustrated in FIGS. 16-18.

The reduction gearing 157 connecting the power transmission gear box 28′ to the drive shaft 57′ is shown in interior detail in FIG. 19, and it will be seen that it merely comprises a multi-step worm gear type of reduction gearing substantially equivalent to that shown in the previously described selector means 39 and is merely adapted to reduce the ratio of rotation of the shaft 57′ to appropriate values for operation of the simulator means 41′ in the manner previously described. It should also be noted that the shaft 57′ passes through a bearing block 158 and has a length compensating linkage 159 to compensate for required variation in the length thereof as the circle frame means 18′ is raised and lowered, etc. This modified form of the invention also has connection members 53′ generally similar to those designated at 53 in the earlier form of the invention intended for similar purposes.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. Blade level control apparatus for a grading machine of the type having main supporting framework means including a depending main framework portion having a rearwardly facing swivel connector means taking the form of a ball and socket joint means provided with and effectively swivelly interconnecting a rearwardly substantially longitudinally directed auxiliary movable circle frame means with respect to said depending main framework portion, said auxiliary circle frame means being provided adjacent to its rear end with a substantially coplanar circle member carrying thereunder a substantially coplanar and normally transversely directed earth scraping and leveling blade member and being provided with rotory mounting means and controllably powered driving means for effectively rotating said circle member around the center thereof with respect to said circle frame means, said main supporting framework means and left and right rear side portions of said circle frame means being effectively provided with and arcuately movably interconnected by a pair of controllably and individually operable extension and retraction actuator means for controllably raising and lowering corresponding rear side portions of said circle frame means with respect to said main supporting framework means, comprising: a blade-position simulator means comprising first, second, and third relatively mutually perpendicularly rotatively interconnected portions, said first simulator means portion being effectively provided with first rotary mounting effectively for mounting same on a rear surface of said depending portion of said main framework means for rotation around a longitudinal fore and aft first axis passing centrally through the center of said swivel connector means, said first and second simulator means portions being effectively provided with and relatively rotatively interconnected by a second rotary mounting means effectively rotatively mounting same for rotation around a second axis substantially perpendicular to said longitudinal first axis, said second and third simulator means portions being effectively provided with and relatively rotatively interconnected by a third rotary mounting means effectively relatively rotatively mounting same for rotation around a third axis substantially perpendicular to both said longitudinal first axis and said second axis perpendicular thereto, said simulator means being provided with an output blade-position simulating portion and effective coupling means effectively coupling same with respect to said blade member for causing corresponding movement of said output portion, in an effective error and correction signal-producing manner, in response to movement of said blade member away from a desired horizontal angular position with respect to said longitudinal first axis.

2. Apparatus as defined in claim 1, wherein said output blade-position simulating portion of said simulator means is also effectively provided with and coupled with respect to an error and correction signal-producing means responsive to said corresponding movement of said output portion for causing a corrective output error and correction signal to be produced.

3. Apparatus as defined in claim 1, wherein said output blade-position simulating portion of said simulator means is also effectively provided with and coupled with respect to an error and correction signal-producing means responsive to said corresponding movement of said output portion for causing a corrective output error and correction signal to be produced for effectively controlling at least one of said controllably and individually operable extension and retraction actuator means connected to corresponding rear side portions of said circle frame means for correspondingly correcting and controlling the vertical elevation thereof in a manner such as to reattain a desired initially selected horizontal angular position of said blade member with respect to said longitudinal first axis.

4. Blade level control apparatus for a grading machine of the type having main supporting framework means including a depending main framework portion having a rearwardly facing swivel connector means taking the form of a ball and socket joint means provided with and effectively swivelly interconnecting a rearwardly substantially longitudinally directed auxiliary movable circle frame means with respect to said depending main framework portion, said auxiliary circle frame means being provided adjacent to its rear end with a substantially coplanar circle member carrying thereunder a substantially coplanar and normally transversely directed earth scraping and leveling blade member and being provided with rotary mounting means and controllably powered driving means for effectively rotating said circle member around the center thereof with respect to said circle frame means, said main supporting framework means and left and right rear side portions of said circle frame means being effectively provided with and arcuately movably interconnected by a pair of controllably and individually operable extension and retraction actuator means for controllably raising and lowering corresponding rear side portions of said circle frame means with respect to said main supporting framework means, comprising: a blade-position simulator means comprising first, second, and third relatively mutually perpendicularly rotatively interconnected portions, said first simulator means portion being effectively provided with first rotary mounting effectively for mounting same on a rear surface of said depending portion of said main framework means for rotation around a longitudinal fore and aft first axis passing centrally through the center of said swivel connector means, said first and second simulator means portions being effectively provided with and relatively rotatively interconnected by a second rotary mounting means effectively relatively rotatively mounting same for rotation around a second axis substantially perpendicular to said longitudinal first axis and very slightly rearwardly offset from said center of said swivel connector means, said second and third simulator means portions being effectively provided with and relatively rotatively interconnected by a third rotary mounting means effectively relatively rotatively mounting same for rotation around a third axis substantially perpendicular to both said longitudinal first axis and said second axis perpendicular thereto and also slightly rearwardly offset from said center of said swivel connector means, said simulator means being provided with an output blade-position simulating portion and effective coupling means effectively coupling said third portion of said simulator means with respect to said circle frame means and said circle member carrying said blade member for causing corresponding movement of said output blade-position simulating portion of said simulator means, in an effective error and correction signal-producing manner, in response to movement of said blade member away from a desired horizontal angular position with respect to said longitudinal first axis, said output blade-position simulating portion of said simulator means being also effectively provided with and coupled with respect to an error and correction signal-producing means responsive to said corresponding movement of said output portion for causing a corrective electrical output error and correction signal of the proper sense to be produced; and servomotor actuator means effectively connected with respect to said error signal-producing means whereby to be controlled and energized by said corrective electrical output error signal produced thereby, said servomotor actuator means being effectively coupled in controlling relationship with respect to at least one of said pair of extension and retraction actuator means connected to corresponding rear side portions of said circle frame means for correspondingly correcting and controlling the elevation thereof in a manner such as to reattain a desired initially selected angular relationship of said blade member with respect to said longitudinal first axis.

5. Apparatus as defined in claim 4, including controllably selectively operable blade angle selector and indicator means for rotative angular positioning in correspondence with a desired blade angle of said blade member and being effectively correlated and synchronized with said correction and error signal-producing means for adjusting the neutral no signal position thereof to correspond to any desired horizontal angular position of said blade member of said grading machine.

6. Apparatus as defined in claim 5, wherein said effective coupling means comprises effective torque tube means effectively connecting said third portion of said simulator means with respect to said circle frame means for rotary movement simultaneously therewith around each of said three mutually perpendicular axes.

7. Apparatus as defined in claim 5, wherein said effective coupling means comprises effective rotary position transmitting means connected with respect to said output portion of said simulator means and responsive to any horizontal angular deviating movement of said blade member resulting from relative rotation of said circle member and said underlying blade member with respect to said circle frame means for correspondingly rotating said output portion of said simulator means.

8. Apparatus as defined in claim 5, wherein said effective coupling means comprises effective torque tube means effectively connecting said third portion of said simulator means with respect to said circle frame means for rotary movement simultaneously therewith around each of said three mutually perpendicular axes and effective rotary position transmitting means connected with respect to said output portion of said simulator means and responsive to any horizontal angular deviating movement of said blade member resulting from relative rotation of said circle member and said underlying blade member with respect to said circle frame means for correspondingly rotating said output portion of said simulator means.

9. Apparatus as defined in claim 5, wherein said effective coupling means comprises effective torque tube means effectively connecting said third portion of said simulator means with respect to said circle frame means for rotary movement simultaneously therewith around each of said three mutually perpendicular axes and effective rotary position transmitting means connected with respect to said output portion of said simulator means and responsive to any horizontal angular deviating movement of said blade member resulting from relative rotation of said circle member and said underlying blade member with respect to said circle frame means for corresponding rotating said output portion of said simulator means, said effective rotary position transmitting means comprising said rotary circle member rotating and driving means and rotary power transmission means driven thereby in synchronized relationship with respect to the rotation of said circle member rotated thereby and rotatively coupled in effective driving relationship with respect to said output portion of said simulator means.

10. Apparatus as defined in claim 5, wherein said effective coupling means comprises effective torque tube means effectively connecting said third portion of said simulator means with respect to said circle frame means for rotary movement simultaneously therewith around each of said three mutually perpendicular axes and effective rotary position transmitting means connected with respect to said output portion of said simulator means and responsive to any horizontal angular deviating movement of said blade member resulting from relative rotation of said circle member and said underlying blade member with respect to said circle frame means for correspondingly rotating said output portion of said simulator means, said effective rotary position transmitting means comprising rotary power transmission means having an input portion fixedly connected with respect to said circle member for rotation therewith and having an intermediate driven portion rotatively driven thereby in response to rotation of said circle member, said intermediate driven portion being effectively in rotary driving relationship with respect to said output portion of said simulator means.

11. Apparatus as defined in claim 5, wherein said error signal-producing means includes a pair of spaced switch contact members effectively comprising first switch element means and an intermediate doubled switch contact member comprising second switch element means relatively rotatively movable with respect to said first switch element means for electrically engaging one or the other of the contact members thereof in response to relative rotative angular displacement of said first and second switch element means in either direction and corresponding to the direction of error or horizontal angular departure of said blade member from a desired angular position with respect to said longitudinal first axis.

12. Apparatus as defined in claim 5, wherein said error signal-producing means includes a pair of spaced switch contact members effectively comprising first switch element means and an intermediate doubled switch contact member comprising second switch element means relatively rotatively movable with respect to said first switch element means for electrically engaging one or the other of the contact members thereof in response to relative rotative angular displacement of said first and second switch element means in either direction and corresponding to the direction of error or horizontal angular departure of said blade member from a desired angular position with respect to said longitudinal first axis, said error signal-producing means being provided with an exterior housing means and an interior depending pendulum means of substantial mass effectively rotatively interconnected near the top of said housing means for relative rotation with respect to each other around a substantially longitudinal auxiliary axis substantially parallel to said longitudinal first axis and additionally being provided with an interior enclosing case means completely enclosing and surrounding said pendulum means and being similarly effectively rotatively interconnected with respect to said exterior housing means for rotation with respect thereto around the same center of rotation as said pendulum means, said first switch element means being effectively carried by said interior enclosing case means which, in turn, is effectively provided with centering spring means and rotary mounting plate means resiliently coupling said case means and said first switch element means with respect to said rotary mounting plate means, which in turn is effectively provided with and effectively rotatively coupled with respect to said controllably selectively operable blade angle selector and indicator means for rotative angular positioning in correspondence with a desired blade angle selected by corresponding rotative angular positioning of said indicator means, said second switch element means being effectively carried by said depending pendulum means normally in a vertical intermediate null position between the spaced contact members of said first switch element means, and said exterior housing means being provided with rotary coupling and linkage means effectively rotatively connected in driven relationship with respect to said output portion of said simulator means for corrective rotation thereby of said exterior housing means in response to the blade member assuming a desired angular position, to rotate said exterior housing means to the same angular extent, but in the opposite direction from a previous rotative angular displacement of said first switch element means and said second switch element means positioned therebetween, back into its normal vertical null position.

13. Apparatus as defined in claim 12, wherein said pendulum means and said interior enclosing case means therearound have substantially the same period of rotary oscillation whereby to minimize the effect of rotary movement inadvertently imparted thereto during operation of the grading machine such as by lurching or the like, whereby to prevent the false production of error signals.

14. Apparatus as defined in claim 13, wherein said interior enclosing case means is provided therein with damping fluid of substantial viscosity and of an electrically insulating type adapted to minimize false electrical engagement of said first and second switch element means during any brief periods of rotary oscillation of said error signal-producing means.

References Cited

UNITED STATES PATENTS 2,961,783  11/1960  Bowen et al. _____ 37—156
3,229,391  1/1966   Breitbarth _____ 37—156

ABRAHAM G. STONE, *Primary Examiner.*

R. L. HOLLISTER, *Assistant Examiner.*